United States Patent [19]

Subramaniam

[11] Patent Number: 5,506,353
[45] Date of Patent: Apr. 9, 1996

[54] PARTICULATE HYDROGENATED STARCH HYDROLYSATE BASED FLAVORING MATERIALS AND USE OF SAME

[75] Inventor: Anandaraman Subramaniam, East Windsor, N.J.

[73] Assignee: Firmenich SA, Geneva, Switzerland

[21] Appl. No.: 215,533

[22] Filed: Mar. 21, 1994

[51] Int. Cl.$^6$ .................. C08B 37/16; A61K 31/725; A23L 1/221
[52] U.S. Cl. .............. 536/103; 424/49; 424/50; 426/96; 426/650; 426/651
[58] Field of Search ............ 424/49, 50; 536/103; 426/96, 650, 651; 514/58, 778, 974

[56] References Cited

U.S. PATENT DOCUMENTS

| | | | |
|---|---|---|---|
| 2,809,895 | 10/1957 | Swisher | 426/650 |
| 3,314,803 | 4/1967 | Dame et al. | 426/96 |
| 3,554,768 | 1/1971 | Feldman | 426/650 |
| 3,704,137 | 11/1972 | Beck | 426/650 |
| 3,736,149 | 5/1973 | Knapp | 426/650 |
| 3,957,964 | 5/1976 | Grimm | 426/534 |
| 3,971,852 | 7/1976 | Brenner et al. | 424/49 |
| 4,001,438 | 1/1977 | Marmo et al. | 424/49 |
| 4,610,890 | 9/1986 | Miller et al. | 426/96 |
| 4,689,235 | 8/1987 | Barnes et al. | 426/650 |
| 4,707,367 | 11/1987 | Miller et al. | 426/96 |
| 4,911,937 | 3/1990 | Crosello et al. | 426/659 |
| 4,980,177 | 12/1990 | Cherukuri et al. | 426/3 |
| 5,013,557 | 5/1991 | Tai | 424/439 |
| 5,087,461 | 2/1992 | Levine et al. | 426/96 |
| 5,135,761 | 8/1992 | Dave et al. | 426/5 |
| 5,266,335 | 11/1993 | Cherukuri et al. | 426/3 |

FOREIGN PATENT DOCUMENTS 2233095  5/1974  France.

OTHER PUBLICATIONS

Database WPI Week 9439. Derwent Publications, Ltd., London, GB; AN 94–314363 & KR B 93 010 538 (Nong Shim Co. Ltd.) 28 Oct. 1993. Abstract.

*Primary Examiner*—Ronald W. Griffin
*Attorney, Agent, or Firm*—Pennie & Edmonds

[57] ABSTRACT

Particulate flavor composition comprising a flavor oil fixed in a particulate low cariogenic matrix of hydrogenated starch hydrolysate and a maltodextrin having a dextrose equivalent value of less than 20.

A process for the encapsulation of a flavor oil comprising forming a homogeneous mixture of the flavor oil with
(a) from about 40 to about 85 percent by weight of a particulate polyol consisting of hydrogenated starch hydrolysate,
(b) from about 10 to about 30 percent by weight of a maltodextrin having a dextrose equivalent of less than 20,
(c) an emulsifier and water,
and spray-drying the resultant mixture to form a particulate product of from about 0.15 to about 0.85 g/cc bulk free flow density.

Method to confer, enhance or modify the flavor properties of a consumable edible material which comprises adding thereto the particulate flavor composition defined above; and method to confer, enhance or modify the flavor properties of a tooth-paste base which comprises adding thereto the particulate flavor composition defined above.

12 Claims, No Drawings

PARTICULATE HYDROGENATED STARCH HYDROLYSATE BASED FLAVORING MATERIALS AND USE OF SAME

BRIEF SUMMARY OF THE INVENTION

The present invention provides a particulate flavor composition comprising a flavor oil fixed in a particulate low cariogenic matrix of hydrogenated starch hydrolysate and a maltodextrin having a dextrose equivalent value of less than 20.

This invention provides further a process for the encapsulation of a flavor oil comprising forming a homogeneous mixture of the flavor oil with (a) from about 40 to about 85 percent by weight of a particulate polyol consisting of hydrogenated starch hydrolysate,
(b) from about 10 to about 30 percent by weight of a maltodextrin having a dextrose equivalent of less than 20,
(c) an emulsifier and water, and spray-drying the resultant mixture to form a particulate product of from about 0.15 to about 0.85 g/cc bulk free flow density.

This invention provides also a method to confer, enhance or modify the flavor properties of consumable edible material which comprises adding thereto a particulate flavor composition as defined above.

Finally, this invention relates to a flavored tooth-paste base containing a particulate flavor composition as defined above.

BACKGROUND OF THE INVENTION

It is well known in the food industry that the addition of flavoring ingredients contribute to a major extent to the palatability of consumable edible materials; consequently, it is paramount to ensure the production of food products which are of consistent flavor quality and are thus attractive to consumers. This can be achieved by ensuring proper flavor stability release. In effect, taste and aroma are greatly influenced by volatile components present in such products. However, because of the volatility of these compounds, it is not easy to ensure that the predetermined critical amounts of each flavor components be present in the food end products as they reach the consumer. Losses of volatile components might occur during storage prior to incorporation into the food product, during mixing of the flavor component with the other food ingredients, during food processing, cooking, baking, during transportation and storage and finally during the preparation of the food product by the consumer himself through, for instance, reheating or microwaving.

These losses of volatile components from the food products may produce undesirable variations in the taste and aroma of the products as perceived by the consumer. On the other hand, losses of volatile components might occur through the conversion of certain flavor materials into unwanted less desirable or tasteless chemicals by their interaction with reagents present in the environment. Oxygen is an example of this type of reagents as it promotes the conversion of several labile flavor materials of current and critical utilization in the industry.

It is not surprising therefore to observe that, in order to reduce or eliminate the afore-mentioned problems associated with volatile and labile flavor components, various attempts have been made to encapsulate such components in certain carbohydrate matrices so as to reduce the volatility or lability of the components. This results in the preparation of stable free flowing powders containing the flavor compositions for later flavor release when incorporated into the food products or when the food product is eventually consumed.

Typical examples of flavor fixation on carbohydrate matrices are provided in U.S. Pat. Nos. 3,314,803; 3,554,768 and 3,736,149. These patents are mainly concerned with the problem associated with the stability of acetaldehyde in different flavor systems. For instance, U.S. Pat. No. 3,554,768 suggests the use of lactose, lactose-maltose, larch-gum, tapioca dextrin and gum Arabic as matrices for encapsulation of acetaldehyde by the method of spray-drying.

U.S. Pat. No. 3,736,149 discloses flavoring compositions which comprise a flavoring agent including acetaldehyde fixed in a matrix material containing lactose, a hydrocolloid gum and a starch hydrolysate.

U.S. Pat. No. 2,809,895 describes a process for encapsulation of an essential oil, such as lemon, lime or grapefruit oils, in a matrix comprising corn syrup, antioxidant and dispersing agent. The essential oil, antioxidant and dispersing agent are added to the corn syrup, the resultant mixture is heated to 85°–125° C. and agitated or extruded to form an emulsion in pellet form, and the resulting particles are washed with a solvent and finally dried.

U.S. Pat. No. 3,704,137 describes an essential oil composition formed by mixing oil with an antioxidant, separately mixing water, sucrose and hydrolyzed cereal solids with DE below 20, emulsifying the two mixtures together, extruding the resulting mixture in the form of rods into a solvent, removing the excess solvent and finally, adding an anti-caking agent.

U.S. Pat. Nos. 4,610,890 and 4,707,367 describe a process for preparing a solid essential oil composition having a high content of the essential oil, which composition is prepared by forming an aqueous solution containing a sugar, a starch hydrolysate and an emulsifier. The essential oil is blended with the aqueous solution in a closed vessel under controlled pressure to form a homogeneous melt, which is then extruded into a relatively cold solvent, dried and combined with an anti-caking agent.

The above-mentioned patents are merely illustrative of the considerable volume of patent literature related to the fixation of flavor ingredients in various matrices.

A problem encountered in prior art compositions is the hygroscopic nature of the resulting matrices. It is important in fact that the matrix do not come into contact with water because this would result in its solubilisation or plasticization with subsequent escape of the volatile components from the matrix. This phenomenon implies that special precautions should apply to the handling of carbohydrate matrices to avoid plasticization by atmospheric moisture.

In addition, another problem encountered in prior art compositions relates to the cariogenic nature of some of the matrices suggested.

The present invention provides particulate flavor compositions with improved characteristics and a method of producing same.

PREFERRED EMBODIMENTS OF THE INVENTION

The present invention is directed to novel particulate flavor compositions which comprise a flavor oil fixed in a particulate low cariogenic matrix of hydrogenated starch hydrolysate and a maltodextrin having a DE value of less than 20.

The invention provides also a process for the encapsulation of a flavor oil comprising forming a homogeneous mixture of the flavor oil with (a) from about 40 to about 85 percent by weight of a particulate polyol consisting of hydrogenated starch hydrolysate,
(b) from about 10 to about 30 percent by weight of a maltodextrin having a dextrose equivalent of less than 20,
(c) an emulsifier and water, and spray-drying the resultant mixture to form a particulate product of from about 0.15 to about 0.85 g/cc bulk free flow density.

The proportions indicated above are deemed to refer to percent of the dry mass present in the total mixture.

According to a preferred embodiment of the process of the invention, water was added to a steam jacketed or similar adequate heated vessel and temperature was brought to 65°–68° C. The predetermined amount of hydrogenated starch hydrolysate and maltodextrin was added to water and mixing was carried by a propeller until complete solution while the temperature was kept at 65°–68° C. throughout the whole operation. A mixture of the chosen flavor oil containing the emulsifier was then added under proper mixing until a uniform solution was obtained. The resultant mixture was homogenized through a high pressure pump and spray-dried through a nozzle at an inlet temperature of 171° C. and an outlet temperature of 82° C. and a pressure of 2000 psi.

As stated above the novel particulate flavor composition of this invention comprises a particulate low cariogenic matrix of hydrogenated starch hydrolysate and a maltodextrin having a dextrose equivalent (DE) of less than 20.

A preferred hydrogenated starch hydrolysate is constituted by a polyol having the following generic formula

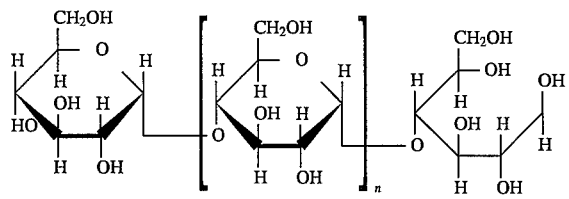

wherein index n stands for an integer. Desirably, the starch hydrolysate has a polyol distribution in the following range (values in percent):

| | |
|---|---|
| DP-1 | 14 |
| DP-2 | 8 |
| DP-3 | 10 |
| DP-4$^+$ | 68 | where "DP" stand for degree of polymerization-of the sugar unit, DP-1 standing for sorbitol.

Suitable hydrogenated starch hydrolysate for use in the above compositions are readily available commercially. More specifically, a preferred commercial product which has been found to give good results in the composition and process of this invention is Flystar (registered tradename of Lonza Inc., Fair Lawn, N.J.), more preferably Hystar® 6075.

The second ingredient of the flavor composition of the invention is a maltodextrin having a DE (dextrose equivalent) of less than 20. Preferably, a maltodextrin with DE of up to 5 is chosen. Maltodextrins are essentially polysaccharides of various commercial origins. One specific maltodextrin which has been found to give good results in the composition and process of this invention is Maltrin (registered tradename of Grain Processing Corp., Muscatine, Iowa). Preferably, Maltrin® M040 is used. It is interesting to note that one of the useful physical parameter for the carbohydrate constituents of the composition of the invention is the glass transition temperature (known as Tg'), a parameter used to predict the stabilization potential of the system. Maltrin® M040 displays a Tg' value of −7.2° C.

As mentioned above, in addition to carbohydrates the composition of the invention comprises an emulsifier. Emulsifiers are critical to achieve a homogeneous mix of the flavor oil in the carbohydrate mixture before spray-drying. The nature and proper amount of the emulsifier can be critically assessed by the process operator without undue experimentation.

Many various emulsifiers are known in commerce. These include specialities such as Centrophase® HR (registered tradename of Central Soya), a natural lecithin, and Capsul® (modified maize starch from National Starch). Their content in the mixture can be of the order of a few percent by weight relative to the amount of the flavor oil. In the case of lecithin, for instance, this proportion can be of the order of about 2 to about 5 percent.

The spray-dry apparatus used in the process of the invention can be of any of various commercially available apparatus. Examples of spray-dry apparatus are the Anhydro Dryers (origin: Anhydro Corp. of Attleboro Falls, Mass.) or the Niro Dryer (manufactured by Niro Atomizer Ltd., Copenhagen, Denmark). Alternatively, Leaflash apparatus (origin: CCM Sulzer) can be utilized.

Oil fix of the order of about 8 to about 25% by weight, based on the weight of the resultant dry particulate material, can be achieved. Oil load, or "fix", can usually be determined by dissolving the matrix and distilling the oil which separates. Subsequent volumetric measure of the thus obtained flavor oil can thus give an indication of the proportion of the oil which has been encapsulated.

The density of the obtained particulate composition is measured by helium picnometers, while microscopy can provide morphological features of the encapsulated particles, revealing surface irregularities or particle damages.

One of the most obvious advantage of the encapsulated particulate compositions obtained in accordance with the invention is their stability toward the aggression of active agents present in the environment, oxygen and moisture in particular. Therefore, a useful discriminatory parameter is the value of oxygen uptake, which provides a measure of matrix permeability to oxygen, which in turn gives an indication of the oxidative stability of an encapsulate. Various methodologies are known for such a measure.

The particulate flavor compositions of the invention can be used in a variety of applications for utilization as flavorants both in edible and non-edible materials. They are especially useful for the stabilization of taste and aroma in food materials which are being stored over time before being consumed. Particularly useful for the aromatization of materials which undergo cooking or simple heating, the use of the particulate flavor compositions of this invention is not limited thereto.

The compositions of the invention can also be utilized for the aromatization of chewing gums.

An interesting novel application has also been developed in the context of this invention. It consists in a method for the aromatization of a tooth-paste base, specially containing aggressive cleaning ingredients such as peroxides.

The tooth-paste flavored with the particulate composition of the invention proved stable on storage and its flavor did not show sign of decomposition or denaturation over time.

The nature of the flavor oil which is encapsulated in the described matrix of the invention is not critical. In effect, a wide variety of volatile active components in liquid or solid form can be employed.

The man of the art knows by experience how to formulate a proper flavor active base having regard to the organoleptic effect he desires to achieve. Examples of flavor active base can be found in the specialized literature and numerous commercial sources provide a broad choice of flavor ingredients and specialities for any sort of applications and flavor profiles.

The invention will be illustrated by, but not limited to, the following examples wherein the temperatures are indicated in degrees centigrade and the abbreviations have the meaning common in the art.

EXAMPLE 1

32.022 Lt of water was poured into a steam jacketed vessel and heated to 65°–68° C., whereupon 25.385 kg of hydrogenated starch hydrolysate [Hystar® 6075] and 9.474 kg of maltodextrin [Maltrin® M040] were added with vigorous stirring while keeping the temperature at 65°–68° C. over the whole operation.

3.531 Kg of a flavor base [Nat. & Art. spice mint blend 723058.12/A; origin: Firmenich Inc., Plainsboro, N.J.] prior mixed with 0.209 kg of emulsifier [Centrophase® HR; origin: Central Soya] were added with stirring, and the prepared feed was homogenized and dried through a high pressure pump at 2000 psi in a spray-drier using a 70/216 nozzle. The inlet air temperature was kept at 171° C., resulting in an outlet air temperature of about 80° C. The particulate flavor powder showed a bulk density of 0.57 g/cc (untamped) and 0.83 g/cc (tamped) while the percentage of oil load in solids was of 8.6 w/w.

Microscopy indicates that the obtained powder consists of very dense, glassy, indented and irregular spheres.

EXAMPLE 2

A Natural & Artificial Sweet Spearmint was processed by following the same method as that described in example 1. Color was added to the base as indicated in the following table of composition

| Ingredients | parts by weight [kg] |
| --- | --- |
| Water | 6.889 |
| Hystar ® 6075 | 5.413 |
| Maltrin ® M040 | 2.030 |
| N & A Spearmint 723051.15/A* | 0.757 |
| Centrophase ® HR | 0.045 |
| D & C Green No. 5 | 0.020 |

*origin: Firmenich Inc.

The encapsulated flavor showed good stability over prolonged storage and did not developed any objectionable off-flavor.

EXAMPLE 3

A citrus oil flavor [Orange oil of Florida 1121 GT-2 05.99; origin: Firmenich Inc.] was processed by centrifugal atomization using a propeller at a speed of 4800 RPM for high shear mixing with an inlet air temperature of 275° C., resulting in an outlet temperature of 107° C.

The following is the table of composition.

| Ingredients | parts by weight[kg] |
| --- | --- |
| Water | 43.61 |
| Orange oil of Florida | 7.93 |
| Hystar ® 6075 | 35.25 |
| Maltrin ® M040 | 9.25 |
| Capsul ® | 3.96 |
| Total | 100.00 |

The particulate flavor composition developed no objectionable off-flavor over prolonged storage.

Stability tests were carried out on samples of the resultant particulate flavor composition by storage at 60° C. over 3 weeks by comparison with a flavor composition resulting from encapsulating, in analogous conditions, a flavor oil in a maltodextrin mixture consisting of 90% Morex 1918 and 10% Nadex 772 (registered trademarks of Roquette Frères).

While samples of this latter composition did show moderate to severe oxidation, the samples resulting from the process of the invention showed no oxidation. After 4 weeks at 60° C., the test samples showed a very slight oxidation, while the control samples were severely oxidized. The shelf life could thus be estimated to be 1.5–2 years versus 0.5 year for the samples obtained by encapsulation over the Morex®/Nadex® matrix.

Samples of each of the above have also been placed in storage at 40° C. for 8, 12 and 16 weeks.

Analytical determination for oxidation by-products was effected on limonene oxide and carvone. The results obtained are summarized in the following table.

TABLE

| | test composition of the invention | | control composition over Morex ® /Nadex 200 | |
| --- | --- | --- | --- | --- |
| | % limonene oxide | % carvone | % limonene oxide | % carvone |
| fresh sample | 0.02 | 0.01 | 0.03 | 0.01 |
| after 8 weeks/ 40° C. | 0.14 | 0.06 | 0.57 | 0.32 |

Particle size distribution was as follows:

| (%) | |
| --- | --- |
| 8.8 | 60 mesh |
| 38.8 | 100 mesh |
| 43.2 | 200 mesh |
| 9.2 | on pan |

Bulk density:0.15 g/cc (untamped); 0.22 g/cc (tamped).

Microscopy indicates that the particles mostly consisted of thin walled ballooned spheres.

EXAMPLE 4

An orange oil [Orange oil of Florida 1121 GT-2 05.99; origin: Firmenich Inc.] was processed as indicated in the previous example 3. Spray-drying however was carried out in a Leaflash (CCM Sulzer) apparatus.

| Ingredients | parts by weight [kg] |
|---|---|
| Water | 24.61 |
| Orange oil of Florida | 11.03 |
| Hystar ® 6075 | 45.97 |
| Maltrin ® M040 | 12.87 |
| Capsul ® | 5.52 |
| Total | 100.00 |

The feed obtained was dried at low pressure with an inlet air temperature of 400° C. resulting in an outlet air temperature of 115° C.

Particle size distribution of the obtained powder was as follows:

| (%) | |
|---|---|
| 3.8 | 60 mesh |
| 12.9 | 100 mesh |
| 42.9 | 200 mesh |
| 40.4 | on pan |

Bulk density: 0.34 g/cc (untamped); 0.50 g/cc (tamped).

Oil content: 13.9% (w/w).

Microscopy indicates dense amorphous particles with a slight to moderate amount of ballooned and fractured particles.

What we claim is:

1. A particulate flavor composition comprising a flavor oil fixed in a particulate low cariogenic matrix of hydrogenated starch hydrolysate and a maltodextrin having a dextrose equivalent value of less than 20.

2. A particulate flavor composition according to claim 1 wherein the flavor is a citrus oil.

3. A particulate flavor composition according to claim 1 wherein the hydrogenated starch hydrolysate is a polyol of generic formula

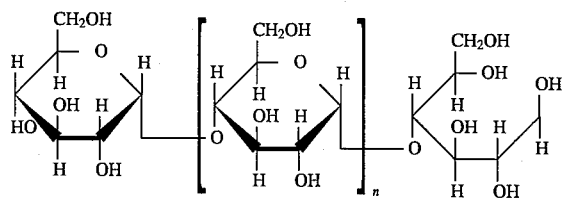

wherein n stands for an integer.

4. A particulate flavor composition according to claim 3 wherein the polyol distribution in the hydrogenated starch hydrolysate is in the following percentage range

| DP-1 | 14 |
|---|---|
| DP-2 | 8 |
| DP-3 | 10 |
| DP-4$^+$ | 68 | wherein "DP" stand for degree of polymerization of the sugar unit.

5. A process for the encapsulation of a flavor oil comprising forming a homogeneous mixture of the flavor oil with
   (a) from about 40 to about 85 percent by weight of a particulate polyol consisting of hydrogenated starch hydrolysate,
   (b) from about 10 to about 30 percent by weight of a maltodextrin having a dextrose equivalent of less than 20,
   (c) an emulsifier and water,
and spray-drying the resultant mixture to form a particulate product of from about 0.15 to about 0.85 g/cc bulk free flow density.

6. The process of claim 5 wherein the homogeneous mixture is obtained by dissolving the discrete ingredients at a temperature of about 60° to 70° C.

7. The particulate flavor composition resulting from the process of claim 5 wherein the amount of flavor oil entrapped therein is up to about 25% per total particulate flavor composition weight.

8. The particulate flavor composition resulting from the process of claim 5 wherein the ratio of polyol to maltodextrin is from about 1.5 to about 8.

9. A method to confer, enhance or modify the flavor properties of a consumable edible material which comprises adding thereto a particulate flavor composition as defined in claim 1.

10. A consumable edible material having enhanced flavor comprising a particulate flavor composition according to claim 1.

11. A method to confer, enhance or modify the flavor properties of a tooth-paste base which comprises adding thereto a particulate flavor composition as defined in claim 1.

12. A flavored tooth-paste base containing a particulate flavor composition as defined in claim 1.

* * * * *